Feb. 27, 1973   SHIGERU SHIBATA   3,718,533
COMPOSITE SHEETS FOR AGRICULTURAL USE
Filed Dec. 16, 1970   2 Sheets-Sheet 1

SHIGERU SHIBATA,
INVENTOR

BY Wenderoth, Lind & Ponack
ATTORNEYS

United States Patent Office 3,718,533
Patented Feb. 27, 1973

3,718,533
COMPOSITE SHEETS FOR AGRICULTURAL USE
Shigeru Shibata, 213 Kamikuze-cho Kuze,
Minami-ku, Kyoto, Japan
Filed Dec. 16, 1970, Ser. No. 98,769
Claims priority, application Japan, May 6, 1970,
45/44,663; Oct. 31, 1970, 45/95,555
Int. Cl. B32b 15/08
U.S. Cl. 161—165                4 Claims

ABSTRACT OF THE DISCLOSURE

A composite sheet for agricultural use comprises a base layer of polyvinylchloride, a polyester film, an aluminum film vapor deposited on the polyester film to a thickness of 80 to 400 A., a protective layer made of a material selected from the group consisting of polyamide and an epoxide resin and applied on the surface of the aluminum film, and a bonding agent cementing the surface of the protective layer to the base layer. The composite sheet transmits approximately 55% of visible rays, but only approximatelyl 30% of infrared rays and approximately 12 to 30% of ultraviolet rays.

BACKGROUND OF THE INVENTION

This invention relates to light transmitting composite sheets for agricultural applications such as heat insulating sheets for greenhouses and heat and insect preventing coatings for poultry farms and stud farms.

When cultivating in hot summer crops which grow in cooler seasons such as spinaches, trefoils and the like or when conducting controlled cultivation of the seedlings of tomatoes, cucumbers and the like, it is the practice to cultivate them in greenhouses covered by heat insulating sheets, cheesecloths for example, which function to intercept portions of the solar light rays for the purpose of preventing the temperature rise of the bed.

White cheesecloth has a percentage of light transmissibility of about 70% whereas that of black cheesecloth is about 50%. However, cheesecloths equally decrease the quantity of light rays of different wavelengths, thus intercepting visible rays which are indispensable to the growth of crops. Thus, the amount of light synthesis is not sufficient. In rainy days, water penetrates through the cheesecloths thus causing diseases of the crops.

The so-called silver film is known to well intercept infrared rays, and the known covering or roofing materials generally intercept solar light rays through their wavelengths, so that even though it is possible to prevent temperature rise they are not suitable to be used during daytime. For this reason, these prior covering materials have been exclusively used to prevent heat dissipation during night in winter.

SUMMARY OF THE INVENTION

It is therefore an object of this invention to provide composite sheets for agricultural use which selectively prevent the transmission of heat rays of solar light rays.

Another object of this invention is to provide a novel composite sheet for agricultural applications which transmits as far as possible visible rays of solar light rays but selectively prevents the transmission of heat rays so that it is suitable for cultivating greens which grow in more cool seasons and for the controlled cultivation of seedlings of fruits.

A further object of this invention is to provide a novel composite light transmitting sheet which is suitable for many other agricultural applications than those just mentioned, for example, for the cultivations of various flowering plants, foliage plants, as well as coatings for poultry and stud farms for preventing heat and diseases during the hot season.

According to this invention there is provided a composite sheet for agricultural use comprising a first film of synthetic resins, an aluminum layer having a thickness ranging from 80 to 400 A. which is vapor deposited on the first film and a second film of synthetic resin applied on the aluminum films, the thickness of the aluminum layer being selected such that it exhibits percentage transmission of more than 10% for visible rays but of less than 80% for heat rays of solar light rays.

The first and second films may be composed of any one of the group consisting of polyester, nylon, polycarbonate, polyethylene, polyvinyl chloride and polypropylene.

BRIEF DESCRIPTION OF THE DRAWINGS

The invention can be more fully understood from the following detailed description taken in conjunction with the accompanying drawings, in which.

DESCRIPTION OF THE PREFERRED EMBODIMENTS

Figure 1:
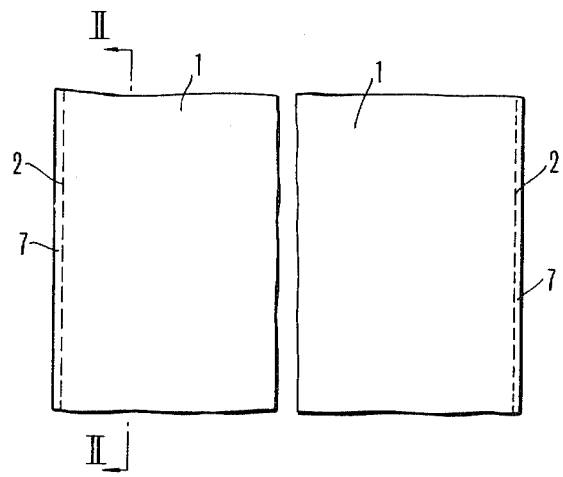
FIG. 1 shows a plan view of a composite sheet embodying this invention.
Figure 2:
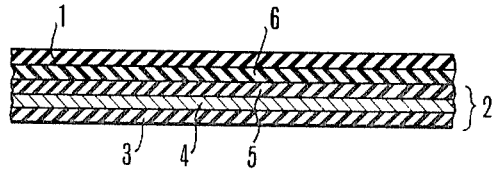
FIG. 2 shows an enlarged sectional view of the sheet shown in FIG. 1, taken along a line II—II.

The novel composite sheet illustrated in FIGS. 1 and 2 comprises a substrate 1 of colourless transparent polyvinyl chloride film for agricultural use having a thickness of 0.05 to 0.075 mm., a width of 950 to 30 cm. and a length of 100 m., for example, and a film 2 including a polyester film 3 having a thickness of 0.012 to 0.025 mm., a width less than the width of the polyvinyl chloride film 1 by about 5 cm. and a length of 100 m., an aluminum film 4 vapor deposited onto the surface of the polyester film 3 to a thickness of 80 to 400A. and a protective layer 5 of polyamide or an epoxide resin for preventing loss of luster. Film 2 is cemented to substrate 1 with its polyester film 3 faced outwardly by means of a bonding agent 6 consisting of an ultraviolet ray absorber such as a polyvinyl acetate incorporated with about 4 to 5% of benzotriazole. The film 2 is bonded to substrate 1 so as to leave margins 7 of about 2.5 cm. on the opposite ends of substrate 1, the margins being bonded to similar margins of other composite sheets, such as by high frequency seam welding, to form a composite sheet of the desired length. The composite sheet thus obtained may be used as an interior curtain of a greenhouse or a vinyl house with its substrates 1 faced outwardly and film 2 inwardly.

The composite sheet can control quantity of the solar light rays transmitted to any desired conditions because it permits transmission of visible light rays which are indispensable to the growth of crops and prevents transmission of heat rays or infrared rays mainly by the reflection thereof on thin aluminum layer 4.

More particularly, in summer, light quantities of 30,000 to 50,000 luxes are suitable for the cultivation of greens such as spinaches and trefoils whereas 40,000 to 70,000 luxes are required for the controlled cultivation of seedlings of fruits such as tomatoes, cucumbers or the like. In some countries, however, for example plains in Japan, on fine days in middle summer, the light quantity often amounts to about 125,000 luxes which is much larger than the preferred quantities mentioned above, so that even when the solar light rays are transmitted through a vinyl film of 0.1 mm. thick, there still is present a light quantity of about 100,000 luxes. However, when using the novel sheet comprising an aluminum film of a thickness of 150 A., a substrate of a vinyl film of a thickness of 0.075 mm. and a polyester film of a thickness of 0.012 mm., the light quantity can be reduced to about 60,000 luxes. When this composite sheet is used superposed upon the above described conventional vinyl film, the light quantity can be reduced to about 45,000 luxes which is adequate for the cultivation of greens under cooler condition and for the controlled cultivation of seedlings of fruits.

Figure 3:
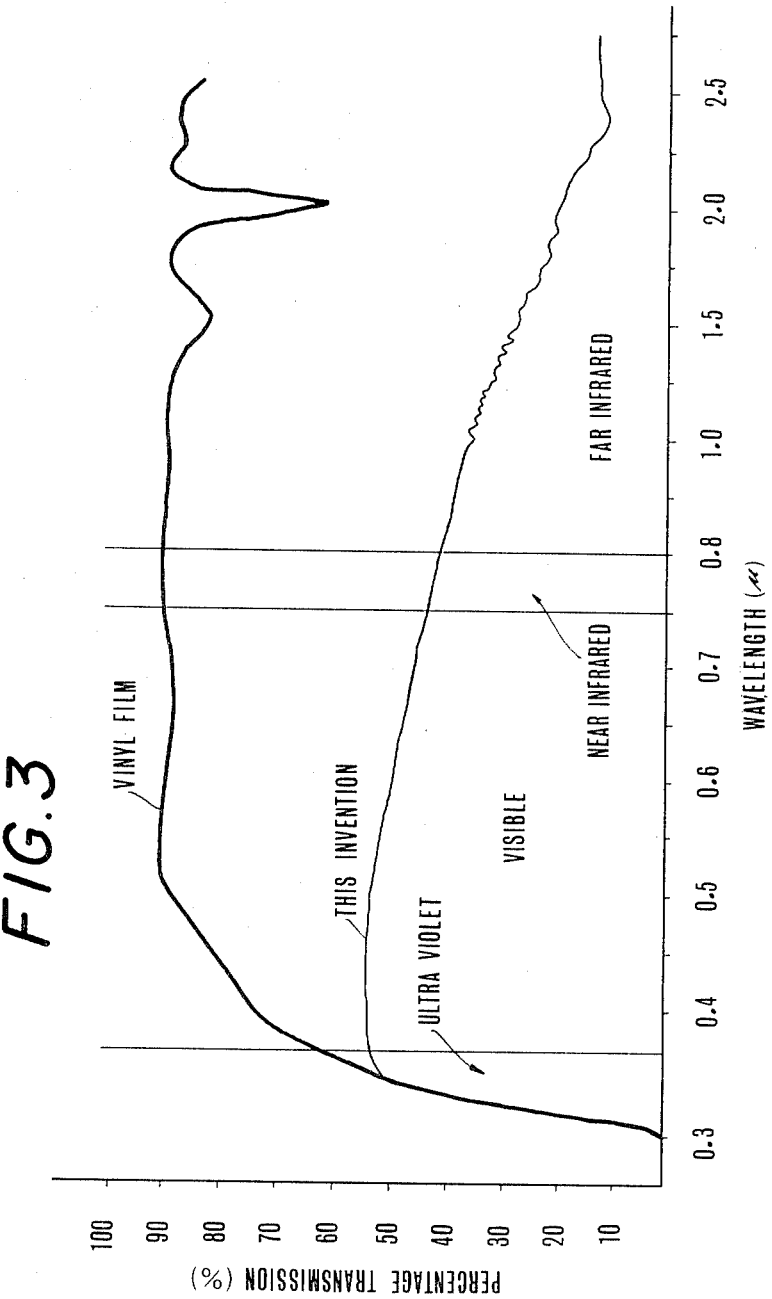
FIG. 3 is a plot to compare the percentage light transmission at various wavelengths of the novel sheet and of a conventional vinyl chloride film.

When the conventional vinyl film is used for these purposes, as shown in FIG. 3, as the percentage transmission of the vinyl film is substantially the same for both visible rays and infrared, if the thickness of the film is increased sufficient to control the transmitted light quantity to an adequate value, the light quantity of visible rays would be too small to ensure satisfactory light synthesis of the crops, thus causing diseases and unfavorable growth. On the contrary, the novel composite sheet illustrated hereinabove provides a percentage transmission of about 55% for the visible light rays (55% for blue light and 48% for red light) whereas only less than 30% for heat rays or infrared rays which are especially suitable for the cultivation of greens under cooler conditions and for the controlled cultivation of seedlings.

Where the aluminum film has a thickness of 400 A. its percentage transmission decreases to 10 to 15% so that the composite sheet becomes suitable for the cultivation of mushrooms whereas an aluminum film of a thickness of 600 A. reduces to substantially zero the percentage transmission of visible rays so that composite sheets including aluminum film thicker than 400 A. are not suitable for practical use. On the other hand, with an aluminum film thinner than 80 A. the percentage transmission of infrared rays approaches to that of visible rays thus rendering ineffective the aluminum film. Such a composite sheet is also useless.

As above described, in the novel composite sheet the reflective action of the aluminum film for heat rays or infrared rays of solar light rays is relied upon to intercept undesired rays for preventing undue temperature rise of the soil but to transmit as far as possible the light quantity of the visible rays which is necessary for the growth of crops. An increase in the thickness of the aluminum film decreases the percentage transmission of both visible rays and infrared rays, and vice versa, so that it is advantageous to limit to 10% the lower limit of the percentage transmission of visible rays and to 80% the upper limit for heat rays, which limits are considered to be suitable for the wide range of applications of the composite sheets mentioned above.

Furthermore, with the novel composite sheet some of the ultraviolet rays are intercepted by the substrate polyvinyl chloride, absorbed by the ultraviolet ray absorbing agent contained in the binder and reflected by the aluminum film thus preventing deterioration of the polyester film by light. Yet it is possible to obtain ultraviolet rays of the quantity required for cultivation. With the above described thickness of the aluminum film and of other various films, it was found that the percentage transmission of ultraviolet rays was about 12 to 30%.

In the illustrated embodiment, since the aluminum film is provided with a protective layer for preventing loss of luster, the reflective ability of the aluminum film can be preserved over a long period of use and oxidation caused by moisture and air are also prevented.

It is also possible to form the protective layer on the aluminum film by coating or spraying a thermoplastic resin.

The heat intercepting effect of the composite sheet is also effective to preserve heat during night.

The following examples are given to illustrate typical applications of the composite sheet.

(1) Cultivation of spinaches

The greenhouse utilized for cultivation was of the simplified construction, that is of the so-called pad and fan type having an air circulating fan and water sprinklers. The greenhouse had a floor area of about 120 m.$^2$ and a total volume of 180 m.$^3$. The fan had a rating of 3 phase, 400 watts and a displacement capacity of 320 m.$^3$/minute. The pad used was a vertical bamboo wall having a width of 3.6 m. and a height of 1.2 m. A polyethylene water tank of a capacity of 300 l. was disposed at the bottom of the pad and the water was sprinkled to flow along the pad by a circulating pump having a capacity of 50 l. per minute. Every morning, well water of 16° C. was filled in the tank and the fan was operated. As an example, on a fine day with a temperature of the atmosphere of 30° C. the temperature of the water decreased to 23° C. in the evening, and the loss of water was about 200 l.

The composite sheet curtain was mounted so that it could be opened suitably on cloudy days when the quantity of light was insufficient.

The types of the spinaches cultivated were the King of Denmark, Viking, Nobel, Misterland, New Asia and Hikari. The seeds were sowed on June 9 with a spacing between levees of 120 cm. Agricultural chemicals were sprinkled from time to time, and the quantities of fertilizers used were 20 kg. of lime, 30 kg. of poultry droppings and 4 kg. of a liquid fertilizer per 120 m.$^2$. Misterland was thinned on July 4, King and Viking were on July 12, and the remaining spinaches were totally harvested on July 25. The growth of spinaches was extremely favourable.

The result of the observation of the growth is as follows. During the early stage the New Asia and Hikari grew well but the others not so well. The New Asia and Hikari began to run to seed on about the 20th day with 5 or 6 leaves and all of them ran to seed on about the 30th day. In Minster, about one half ran to seed. Although no such tendency was noted for the Viking and King even after 60 days, their speed of growth was a medium. The Nobel grew most slowly but tillered well and was late to run to seed so that this species was most suitable to cultivate over a long period.

Considering now the species from the standpoint of harvest, even the species having a tendency toward early running to seed (Japanese species) can be harvested at about 20 days (without the novel composite sheet, this species can not be harvested at such a time). When it is desired to harvest on the 40th day the King and Viking are preferred whereas on the 50th day Nobel is preferred. On the 50th day Nobel had grown to have 20 leaves, a height of 26 cm. and a weight of 80 g.

On fine days, the maximum temperature inside the greenhouse was lower by about 7° C. than the outside temperature and the inside humidity was higher by 20%. During the 6 days from June 28 to July 3, temperatures inside and outside of the greenhouse were measured by an automatic thermometer. The thermostat was set to 25° C. and the water was sprinkled on the pad concurrently with the operation of the air circulating fan. On fine days, the outdoor temperature was 33° C. whereas the indoor temperature was 27° C., that is the difference was 6° C. At night, the indoor temperature was higher by 1 to 2° C. When water sprinkling was begun together with the operation of the circulating fan, the humidity reached a value of 80 to 90%, whereas during night water sprinkling was stopped and the humidity was decreased to 60%. Since it is recognized that a humidity of approximately 80% is adequate for improving absorption of the nutrient the fan and pad system described above is especially suitable. The brightness measured was 85,000 luxes beneath a vinyl sheet whereas about 40,000 luxes beneath the novel composite sheet which is comparable with that in spring.

(2) Cultivation of trefoils with flooded gravel beds

With a flooded gravel bed, the temperature of the bed often exceeds 35° C. in summer (July) so that it has been difficult to cultivate trefoils with such a bed. When cultivating trefoils with the novel composite sheet, seeds were sowed in six stripes on a bed of 80 cm. wide and the harvest was 36 bundles per one meter of the bed length, whereas a greenhouse employing a cheesecloth yielded only 15 bundles.

(3) Controlled cultivation of the seedlings of tomatoes and cucumbers

The seedlings were cultivated with a flooded gravel bed. The seedlings of tomatoes were cultivated for the 30 days from July 8 to August 5 whereas those of cucumbers for the 15 days from August 11 to August 25. The inside temperature of a greenhouse utilizing the novel composite sheet was lower than the outside temperature by 5 to 6 degrees. Seedlings cultivated in this manner were very sound, and have grown not too fast when compared with those cultivated with a cheesecloth.

Thus, this invention provides a novel composite agricultural sheet which is especially suitable to be used as a heat interrupting sheet for cultivating in summer greens under cooler conditions as well as for the controlled cultivation of the seedlings of fruits. The sheet can also be used for the cultivation of foliage plants and as coverings for poultry and stud farms to prevent heat and insects. The novel composite sheet prevents transmission of heat rays but decreases only slightly visible rays indispensable for the growth of plants and animals.

While the invention has been shown and described in terms of its preferred embodiment, it will be clear that many changes and modifications may be made within the scope of the invention as defined in the appended claims.

What is claimed is:

1. A composite sheet for agricultural use comprising a base layer of polyvinyl chloride, a polyester film, an aluminum film vapor deposited on said polyester film to a thickness of 80 to 400 A., a protective layer made of a material selected from the group consisting of polyamide and an epoxide resin and applied on the surface of said aluminum film and a bonding agent incorporated with an ultraviolet ray absorbing agent, said bonding agent cementing the surface of said protective layer to said base layer, the composite sheet having a percentage transmission of approximately 55% for visible rays approximately 30% for infrared rays and approximately 12 to 30% for ultraviolet rays.

2. The composite sheet according to claim 1 wherein said polyester film has a thickness of 0.012 to 0.025 mm.

3. The composite sheet according to claim 1 wherein said base layer of polyvinyl chloride has a thickness of 0.05 to 0.075 mm.

4. The composite sheet according to claim 1 wherein said bonding agent consists of polyvinyl acetate containing approximately 4 to 5% benzotriazole.

References Cited

UNITED STATES PATENTS

| | | |
|---|---|---|
| 2,993,806 | 7/1961 | Fisher et al. _____ 161—218 X |
| 3,516,720 | 6/1970 | Mauer _____ 117—124 X |
| 3,290,203 | 12/1966 | Antonson _____ 161—408 X |
| 2,714,569 | 8/1955 | Prindle _____ 161—409 X |
| 2,804,416 | 8/1957 | Phillipsen _____ 161—218 |
| 3,297,462 | 1/1967 | Fanning _____ 117—33.3 |
| 3,308,004 | 3/1967 | Roualt _____ 350—1 X |
| 3,398,040 | 8/1968 | Allen et al. _____ 350—1 X |
| 3,113,907 | 12/1963 | Tocker _____ 156—332 X |
| 3,359,153 | 12/1967 | Bean _____ 156—332 X |

FOREIGN PATENTS 528,142  7/1956  Canada _____ 156—332

WILLIAM D. MARTIN, Primary Examiner

W. H. SCHMIDT, Assistant Examiner

117—33.3, 71 R, 76 F, 107; 161—1, 186, 214, 218, 227; 350—1